(12) United States Patent
Chun et al.

(10) Patent No.: US 11,608,276 B2
(45) Date of Patent: Mar. 21, 2023

(54) PALLADIUM HYDRIDE HAVING HCP CRYSTAL STRUCTURE AND PREPARATION METHOD THEREOF

(71) Applicant: KOREA INSTITUTE OF SCIENCE AND TECHNOLOGY, Seoul (KR)

(72) Inventors: Dong Won Chun, Seoul (KR); Sung Jong Yoo, Seoul (KR); Jaeyoung Hong, Seoul (KR); Hee-Young Park, Seoul (KR); Young-Su Lee, Seoul (KR); Jin-Yoo Suh, Seoul (KR); Jee-Hwan Bae, Seoul (KR); Min Kyung Cho, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 276 days.

(21) Appl. No.: 17/036,726

(22) Filed: Sep. 29, 2020

(65) Prior Publication Data

US 2021/0253445 A1 Aug. 19, 2021

(30) Foreign Application Priority Data

Feb. 18, 2020 (KR) .................. 10-2020-0019831

(51) Int. Cl.
*C01G 55/00* (2006.01)
*B82Y 40/00* (2011.01)
*B82Y 30/00* (2011.01)

(52) U.S. Cl.
CPC .............. *C01G 55/00* (2013.01); *B82Y 30/00* (2013.01); *B82Y 40/00* (2013.01); *C01P 2002/90* (2013.01)

(58) Field of Classification Search
CPC ........ C01G 55/00; B82Y 30/00; B82Y 40/00; C01P 2002/90
See application file for complete search history.

(56) References Cited

FOREIGN PATENT DOCUMENTS

KR 1020160071198 A 6/2016

OTHER PUBLICATIONS

Wang et al. "Palladium structure engineering induced by electrochemical H intercalation boosts hydrogen evolution catalysis", 2019. Journal of Materials Chemistry, The Royal Society of Chemicatry, p. 1-18. (Year: 2019).*
Xiao Yang et al., "Formation and electronic properties of palladium hydrides and palladium-rhodium dihydride alloys under pressure", Scientific Reports, Jun. 14, 2017, pp. 1-6, vol. 7, No. 3520.
Jungwon Park et al., "Direct Observation of Nanoparticle Superlattice Formation by Using Liquid Cell Transmission Electron Microscopy", ACS NANO, Feb. 23, 2012, pp. 2078-2805, vol. 6, No. 3.

* cited by examiner

Primary Examiner — Coris Fung
Assistant Examiner — Catriona M Corallo
(74) Attorney, Agent, or Firm — Rabin & Berdo, P.C.

(57) ABSTRACT

According to an embodiment of the present invention, the method includes: (a) preparing a liquid cell containing a palladium precursor solution; (b) applying electron beams to the palladium precursor solution contained in the liquid cell; and (c) generating palladium hydride nanoparticles having the hcp crystal structure in the palladium precursor solution.

7 Claims, 9 Drawing Sheets

Nucleation → growth

PALLADIUM HYDRIDE HAVING HCP CRYSTAL STRUCTURE AND PREPARATION METHOD THEREOF

CROSS-REFERENCE TO RELATED APPLICATION

This application claims the benefit of Korean Patent Application No. 10-2020-0019831, filed on Feb. 18, 2020, in the Korean Intellectual Property Office, the disclosure of which is incorporated herein in its entirety by reference.

BACKGROUND

1. Field

The present invention relates to a palladium hydride having a hexagonal close packing (hcp) crystal structure and a preparation method and an application thereof, and more particularly, to a technique for manufacturing palladium hydride nanoparticles having a hcp crystal structure, which is not conventionally known in the art, by high-energy electron beam irradiation.

2. Description of the Related Art

Palladium as a catalyst material used in a variety of chemical processes has excellent ability to store hydrogen at room temperature and atmospheric pressure. One or less hydrogen atom is absorbed into one palladium atom to produce a palladium hydride ($PdH_x$) at room temperature. Although other transition metals have such ability to store hydrogen, palladium has much better hydrogen-absorbing ability than other transition metals and retains ductility even when the number of hydrogen atoms bonded thereto increases. This property has drawn attention in research to develop efficient and inexpensive hydrogen-storing materials.

In addition, palladium compounds may be used in organic chemistry as catalysts in reactions for generating carbon chains such as Heck, Stille, Suzuki, Sonogashira, and Buchwald-Hartwig reactions or as catalysts for producing hydrogen from organic hydrogen compounds such as formic acid and ammonia-borane.

In general, palladium having a face-centered cubic (fcc) structure stores hydrogen in a hydrogen storage site in unit lattices of palladium in the form of a hydride. In this case, it is known that a metal is deformed by interactions between hydrogen atoms and metal atoms. A crystal structure of the metal may be deformed to reduce internal stress generated as a result of storing hydrogen. However, it is known that palladium hydrides generally have a fcc crystal structure.

RELATED ART

Patent Documents

Patent Document 1: Korean Laid-open Patent Application No. 10-2016-0071198 (Jun. 21, 2016)

SUMMARY

The present invention provides a method of preparing a palladium hydride having a hexagonal close packing (hcp) crystal structure, which is not conventionally known in the art, by applying high energy to a palladium precursor material. However, problems to be solved are illustrative and the scope of the present invention is not limited thereby.

Additional aspects will be set forth in part in the description which follows and, in part, will be apparent from the description, or may be learned by practice of the presented embodiments.

According to an aspect of the present invention, provided is a method of preparing palladium hydride nanoparticles having a hexagonal close packing (hcp) crystal structure.

According to an embodiment of the present invention, the method includes (a) preparing a liquid cell containing a palladium precursor solution; (b) applying electron beams to the palladium precursor solution contained in the liquid cell; and (c) generating palladium hydride nanoparticles having the hcp crystal structure in the palladium precursor solution.

According to an embodiment of the present invention, the liquid cell may operate in a transmission electron microscope.

According to an embodiment of the present invention, an acceleration voltage of the electron beams may be in the range of 10 kV to 1000 kV.

According to an embodiment of the present invention, when the liquid cell is a graphene liquid cell (GLC) or a silicon nitride ($Si_3N$) liquid cell, an electron beam dose rate may be in the range of $5.0 \times 10^{-1}$ to $1.0 \times 10^4$ e⁻/(Å²·s).

According to an embodiment of the present invention, a palladium precursor included in the palladium precursor solution may have a hcp crystal structure.

According to an embodiment of the present invention, the palladium precursor material may be one selected from the group consisting of a palladium nitride, a palladium chloride, a palladium sulfide, a palladium acetate, a palladium acetylacetonate, a palladium cyanate, a palladium isopropyl oxide, a palladium butoxide, and any combination thereof.

According to an embodiment of the present invention, the palladium hydride nanoparticles may be nanoparticles of a compound represented by Formula 1 below:

$PdH_x$ (0<x≤2).                                                                Formula 1

According to another aspect of the present invention, provided is a palladium hydride having a hcp crystal structure and represented by Formula 1 below:

$PdH_x$ (0<x≤2).                                                                Formula 1

According to another aspect of the present invention, provided is a hydrogen-storing material including the palladium hydride.

According to another aspect of the present invention, provided is a catalyst for hydrogen generation including the palladium hydride.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
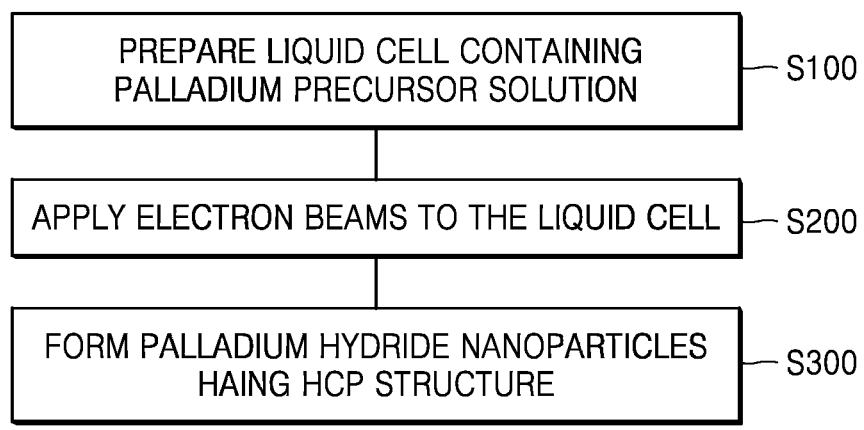
FIG. 1 is a flowchart of a method of preparing palladium hydride nanoparticles having a hcp crystal structure according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the concept of the invention to those skilled in the art. In the drawings, thicknesses or sizes of layers and regions are exaggerated for clarity.

Hereinafter, a palladium hydride having a hcp crystal structure according to an embodiment of the present invention will be described in detail with reference to the accompanying drawings.

FIG. 1 is a flowchart of a method of preparing palladium hydride nanoparticles having a hcp crystal structure according to an embodiment of the present invention.

Referring to FIG. 1, the method may include (a) preparing a liquid cell containing a palladium precursor solution including a palladium precursor material (S100), (b) emitting electron beams to the liquid cell (S200), and (c) generating palladium hydride nanoparticles having a hcp crystal structure (S300).

The palladium precursor material may be one selected from the group consisting of a palladium nitride, a palladium chloride, a palladium sulfide, a palladium acetate, a palladium acetylacetonate, a palladium cyanate, a palladium isopropyl oxide, a palladium butoxide, and any combination thereof.

For example, the palladium precursor material may be palladium (II) acetylacetoante (Pd(acac)$_2$), palladium (II) acetate (Pd(ac)$_2$), palladium (II) chloride (PdCl$_2$), palladium (II) bromide (PdBr$_2$), palladium (II) iodide (PdI$_2$), chloropalladic acid (H$_2$PdCl$_6$), palladium sulfate (PdSO$_4$), palladium (II) nitrate (Pd(NO$_3$)$_2$) palladium (II) cyanide (Pd(CN)$_2$), tetraamine palladium bromide (Pd(NH$_3$)$_4$(Br)$_2$), diamine dinitro palladium (Pd(NO$_2$)$_2$(NH$_3$)$_2$), palladium tetra ammonium nitrate (Pd(NH$_3$)$_4$(NO$_3$)$_2$), palladium oxalate (PdC$_2$O$_4$), sodium palladium tetrachloride (Na$_2$PdCl$_4$), or the like.

The palladium precursor solution may be prepared by dissolving the palladium precursor material in water or an organic solvent.

Figure 2:
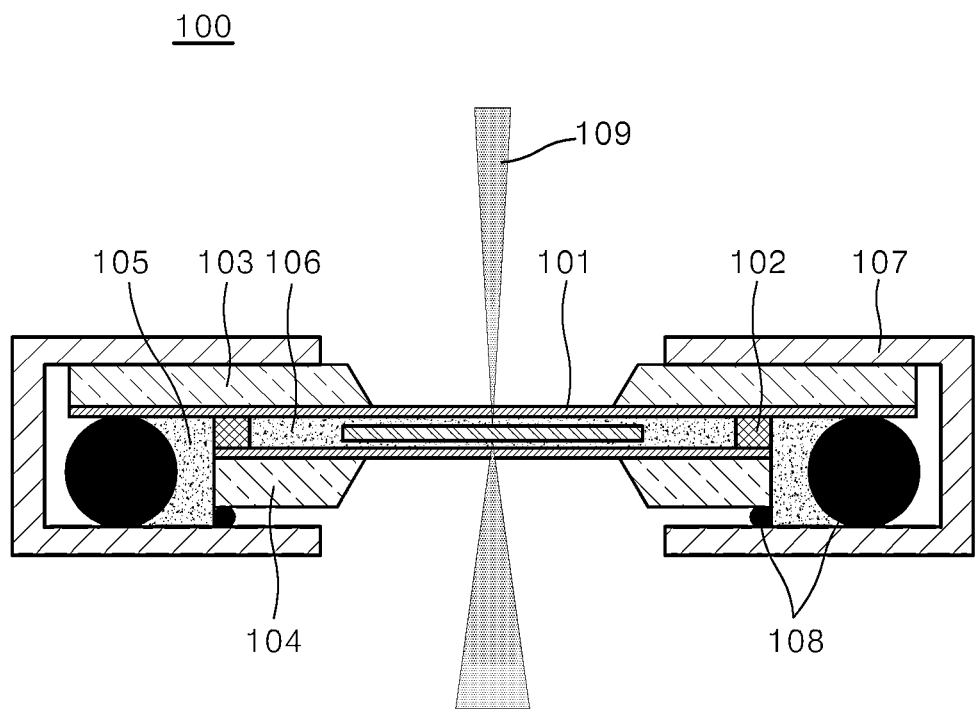
FIG. 2 exemplarily shows a structure of a liquid cell containing a palladium precursor solution.

The palladium precursor solution prepared as described above is contained in the liquid cell. The liquid cell is a cell having a structure in which a liquid phase is contained between membranes arranged to face each other and spaced apart from each other at a predetermined interval. FIG. 2 exemplarily shows a liquid cell 100.

Referring to FIG. 2, the liquid cell 100 includes membranes 101 facing each other and spaced apart from each other at a predetermined distance. In order to maintain the predetermined distance, spacers 102 are located between the membranes 101. One end of the membranes 101 that are spaced apart from each other by the spacers 102 is fixed in a state of being inserted between an upper chip 103 and a lower chip 104. A liquid phase 106 contained in a liquid port 105 is introduced into a space between the membranes 101 through an opening formed at a side of the spacer 102. An O-ring 108 for preventing leakage of the liquid phase 106 is located in a frame 107 that supports the upper chip 103 and the lower chip 104. The membrane 101 transmits electron beams 109 and may be formed of, for example, a thin film of graphene or silicon nitride (Si$_3$N).

Electron beams 109 are applied to the liquid cell 100 after the palladium precursor solution is contained in the liquid cell 100. The present inventors have found that palladium hydride nanoparticles are generated in a palladium precursor solution by electron beam irradiation applied to a liquid cell containing a palladium precursor solution, and the generated palladium hydride nanoparticles have the hcp crystal structure instead of a fcc crystal structure well known in the art.

An acceleration voltage of the electron beams may be in the range of 10 kV to 1000 kV, preferably, 300 kV. When the acceleration voltage of the electron beams is less than 10 kV, the electron beams 109 cannot sufficiently penetrate into the solution due to insufficient energy of electrons, making it difficult to synthesize the palladium hydride from a metal precursor. When the acceleration voltage of the electron beam is greater than 1000 kV, palladium hydride particles may be degraded by accelerated electrons.

According to an embodiment of the present invention, the palladium precursor material has the hcp crystal structure, and dissociation of the palladium precursor molecules may occur by the electron beams 109. One or more chemical bonds thereof may be broken since they are exposed to high energy flux. The palladium hydride is a hydride in which hydrogen atoms are contained in the crystal lattice of palladium and may be rearranged into a hcp crystal structure to include hydrogen atoms in the hcp crystal lattice. According to the electron beam dose rate applied thereto, a part of the crystal structure may be rearranged to have a mixed crystal structure including both the hcp crystal structure and the fcc crystal structure.

After electron beam irradiation is completed, the palladium precursor solution is discharged from the liquid cell, and the palladium hydride nanoparticles having the hcp crystal structure are separated from the palladium precursor solution. The palladium hydride nanoparticles having the hcp crystal structure may be applied to hydrogen-storing materials or catalysts for generating hydrogen.

Any device capable of preparing the palladium hydride nanoparticles having the hcp crystal structure by using the above-described method may be used, as long as the device includes a mount on which the liquid cell is mounted and an electron beam irradiation unit configured to emit high-energy electron beams to the liquid cell.

For example, in the electron beam irradiation applied to the palladium precursor solution contained in the liquid cell, a transmission electron microscope (TEM) may be used. The TEM is a measuring device for analyzing a structure of a sample by using diffraction information of transmitted electrons after emitting high-energy electron beams to the sample in the form of membrane. Therefore, the palladium hydride nanoparticles having the hcp crystal structure may be prepared by mounting the sample having the liquid cell structure containing the palladium precursor solution and emitting high-energy electron beams thereto.

Hereinafter, experimental examples implemented according to embodiments of the present invention will be described in detail by using a transmission electron microscope. However, the following experimental examples are provided to assist the understanding of the present invention and are not intended to limit the purpose and scope of the present invention.

Experimental Example

Sodium palladium tetrachloride ($Na_2PdCl_4$, 99.8%, Sigma-aldrich) used as a raw material was dissolved in distilled water to a predetermined concentration to prepare a palladium precursor aqueous solution. The palladium precursor aqueous solution was contained in a graphene liquid cell (GLC) using graphene membranes and a silicon nitride liquid cell (SLC) using silicon nitride ($Si_3N$) membranes, respectively. The GLC and the SLC each containing the palladium precursor aqueous solution were placed in a transmission electron microscope (TEM). Membrane thicknesses of the GLC and SLC were 10 nm and 50 nm, respectively. Then, the palladium precursor aqueous solution contained in the liquid cells was irradiated with high-energy electron beams, and accordingly, nanoparticles were formed in the palladium precursor aqueous solution. An acceleration voltage of the electron beams 110 applied to the liquid cell was in the range of 200 to 300 kV, and an electron beam dose rate was in the range of $1.0 \times 10^4$ to $6.0 \times 10^{-1}$ $e^-/(Å^2·s)$. In the present embodiment, changes in the crystal structures of nanoparticles generated in the palladium precursor aqueous solution were observed in-situ by analyzing electron diffraction patterns of the nanoparticles generated by electron beam irradiation.

The crystal structures of the palladium hydrides formed according to the respective electron beam dose rates were analyzed, and the results are shown in Table 1 below.

TABLE 1

| Sample | Electron beam dose rate ($e^-/(Å^2 · s)$) | Liquid cell | Crystal structure |
|---|---|---|---|
| 1 | $1.0 \times 10^4$ | GLC | hcp |
| 2 | $5.0 \times 10^2$ | GLC | hcp |
| 3 | $5.0 \times 10^1$ | GLC | hcp + fcc |
| 4 | $6.0 \times 10^{-1}$ | GLC | hcp + fcc |
| 5 | $1.0 \times 10^4$ | SLC | hcp |
| 6 | $5.0 \times 10^2$ | SLC | fcc + hcp |
| 7 | $5.0 \times 10^1$ | SLC | fcc + hcp |
| 8 | $6.0 \times 10^{-1}$ | SLC | fcc + hcp |

Referring to Table 1, the hcp structure was observed in all electron beam dose rates when the GLC was used (Samples 1 to 4). Specifically, when the electron beam dose rate was in the rage of $1.0 \times 10^4$ to $5.0 \times 10^2$ $e^-/(Å^2·s)$, all of the generated nanoparticles had the hcp structure, and when the electron beam dose rate was in a lower range of $5.0 \times 10^1$ to $6.0 \times 10^{-1}$ $e^-/(Å^2·s)$, a mixed phase of the hcp structure and the fcc structure was observed.

Figure 3:
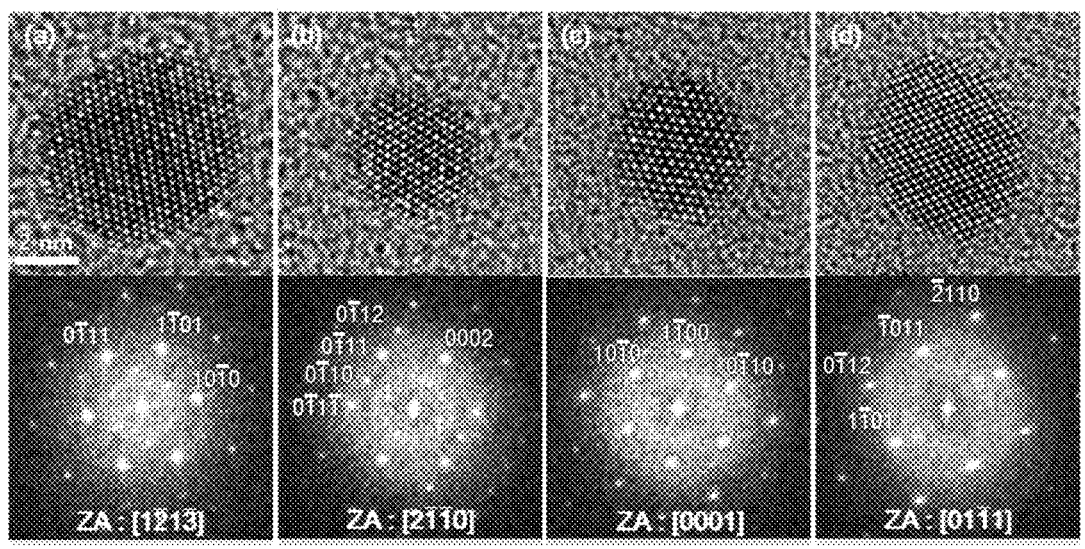
FIG. 3 shows transmission electron microscope (TEM) electron diffraction pattern analysis results of palladium hydride nanoparticles prepared according to an embodiment of the present invention.

In FIG. 3, analysis results of electron diffraction patterns of the nanoparticles corresponding to Sample 1 obtained in various zone axes are shown.

Referring to electron diffraction patterns of FIG. 3, it was confirmed that the generated nanoparticles had the hcp crystal structure based on the results of analyzing electron diffraction patterns in various zone axes.

Meanwhile, when the SLC was used, the nanoparticles generated at the electron beam dose rate of $1.0 \times 10^4$ $e^-/(Å^2·s)$ (Sample 5) had the hcp structure. However, a percentage of the fcc structure increased as the electron beam dose rate decreased indicating that more than 90% of the nanoparticles generated at the electron beam dose rate of $5.0 \times 10^1$ $e^-/(Å^2·s)$ (Samples 7 and 8) had the fcc crystal structure and a part had the hcp crystal structure.

Figure 4A:
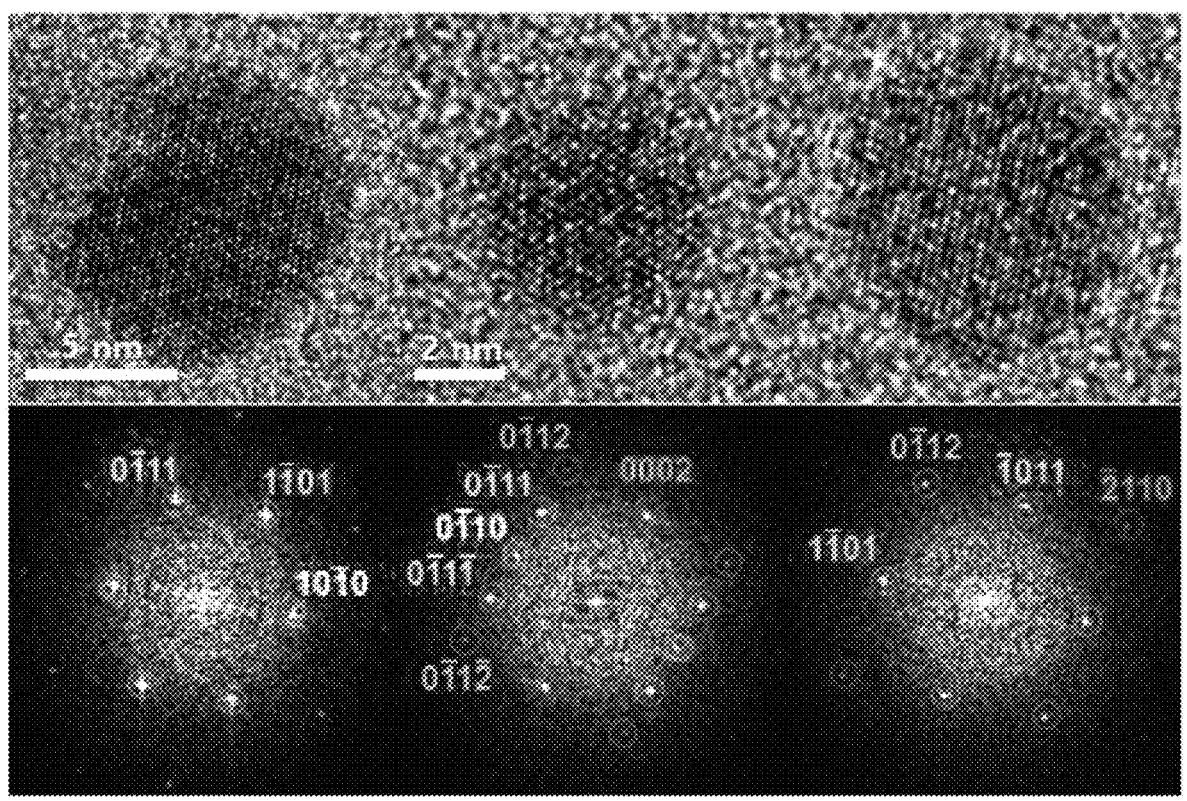
FIG. 4A shows high resolution transmission electron microscope (HR-TEM) electron diffraction pattern analysis results of palladium hydride nanoparticles generated at the electron beam dose rate of $1.0 \times 10^4$ e$^-$/(Å$^2$·s)
Figure 4B:
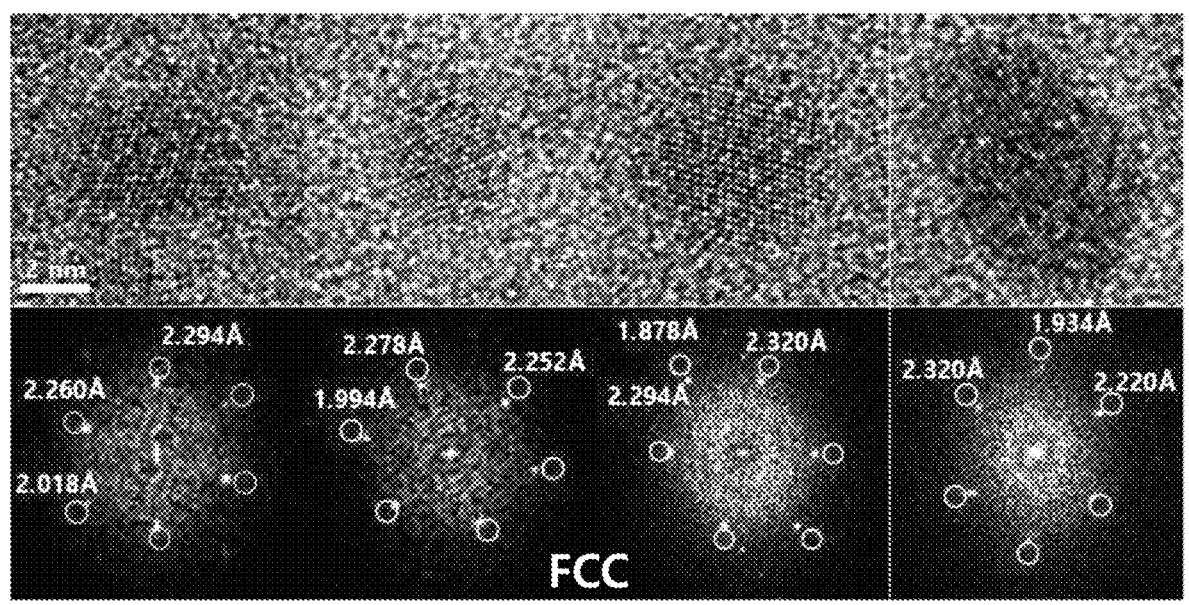
FIG. 4B shows high resolution transmission electron microscope (HR-TEM) electron diffraction pattern analysis results of palladium hydride nanoparticles generated at the electron beam dose rate of $5.0 \times 10^2$ e$^-$/(Å$^2$·s)

FIG. 4A shows electron diffraction pattern of Sample 4 and FIG. 4B shows electron diffraction pattern of Sample 8. Referring to this, it may be confirmed that Samples 4 and 8 show diffraction patterns of the hcp structure and the fcc structure, respectively.

Based thereon, it may be confirmed that more nanoparticles have the hcp structure as the electron beam dose rate increases. Also, the SLC has a higher percentage of the fcc crystal structure than the GLC. This is because the thickness of the silicon nitride membrane constituting the SLC is greater than that of the graphene membrane constituting the GLC, so that the amount of electron beams arriving at the liquid cell after penetrating the silicon nitride membrane decreases.

Figure 5A:
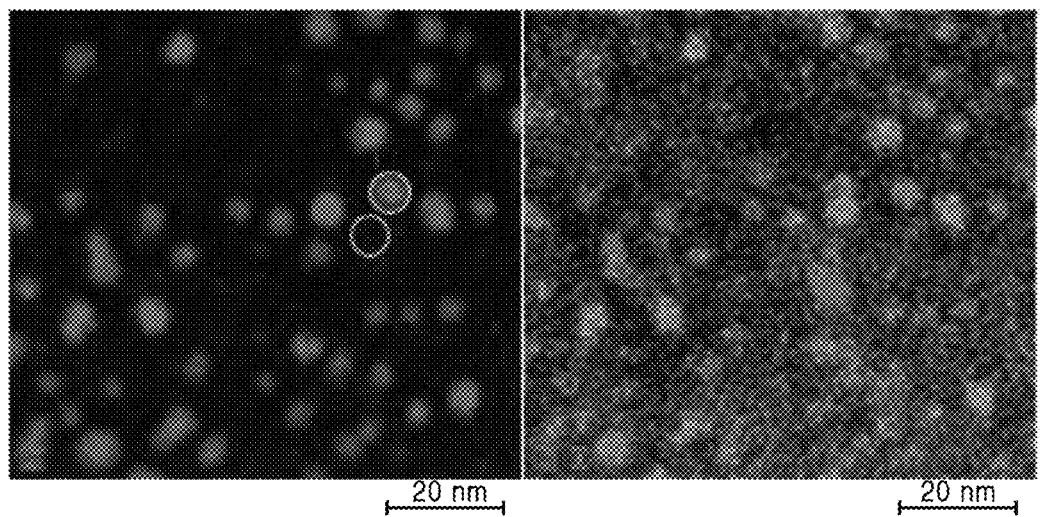
FIG. 5A shows mapping image of components of palladium hydride nanoparticles prepared according to an embodiment of the present invention using an energy dispersive spectrometer.

FIG. 5A shows mapping image of analyzing components of nanoparticles corresponding to Sample 1 using an energy dispersive spectrometer (EDS). Left image of FIG. 5A shows Pd only, and the right image of FIG. 5A shows Pd and O (background), which means that there is no oxygen in the nanoparticles.

Figure 5B:
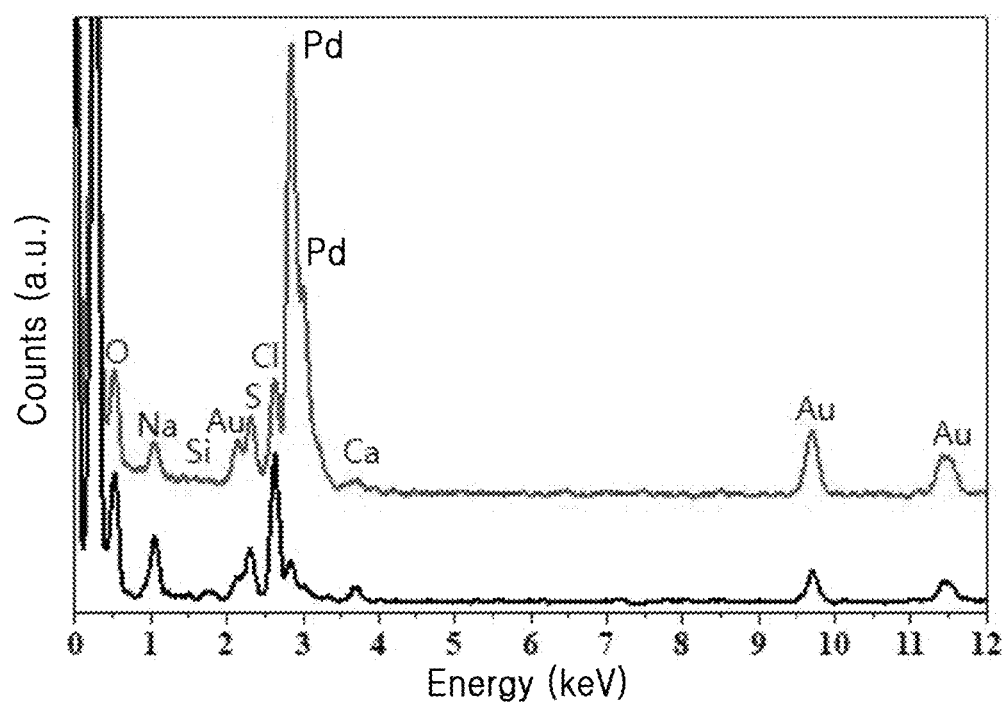
FIG. 5B shows analysis results of components of palladium hydride nanoparticles prepared according to an embodiment of the present invention using an energy dispersive spectrometer.

FIG. 5B shows analysis results of components of palladium hydride nanoparticles prepared according to an embodiment of the present invention using an energy dispersive spectrometer. Referring to FIG. 5B, in addition to Pd, any other elements were not detected. Since only Pd, Na, Cl, $H_2O$, and isopropanol existed in the palladium aqueous solution as a starting material, it may be inferred that H was generated by dissociation of molecules by electron beams, and the generated nanoparticles are those of a palladium hydride.

Table 2 shows lattice constants of nanoparticles corresponding to Sample 1 in [2-1-10] and [1-21-3] directions. Table 2 also shows calculated theoretical values of lattice constants according to the amount of H of the palladium hydride having the hcp structure.

TABLE 2

| | hcp | Lattice constant (Å) | | |
|---|---|---|---|---|
| | | a | c | c/a |
| Measured value | PdHx([2-1-10]) | 2.93 | 4.81 | 1.64 |
| | PdHx([1-21-3]) | 2.94 | 4.98 | 1.7 |
| Calculated value | Pd | 2.728 | 4.563 | 1.673 |
| | $PdH_{0.5}$ | 2.803 | 4.667 | 1.665 |
| | PdH | 2.871 | 4.785 | 1.667 |
| | $PdH_{1.25}$ | 2.941 | 4.915 | 1.671 |

Referring to Table 2, the lattice constants of the generated nanoparticles are almost identical to the theoretical lattice constants of the palladium hydride having the hcp structure, and thus it may be confirmed that the generated nanoparticles are nanoparticles of the palladium hydride having the hcp crystal structure.

Figure 6A:
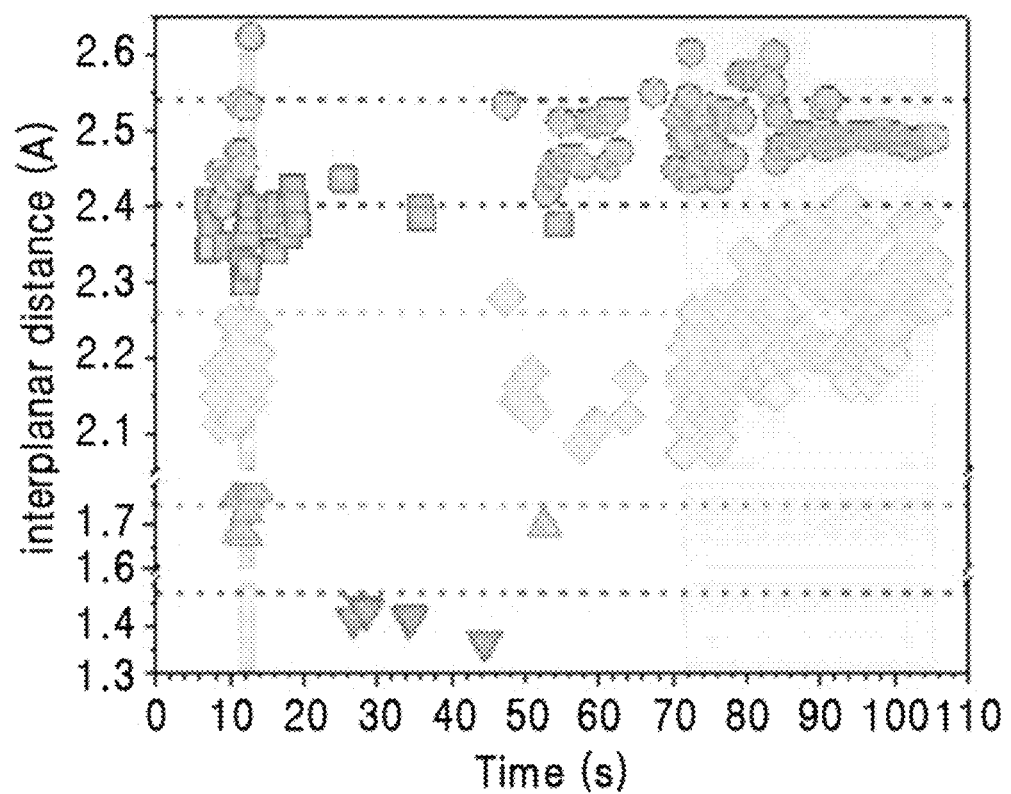
FIG. 6A shows interplanar distance changes of the nanoparticles over time in the analysis results of electron diffraction pattern.
Figure 6B:
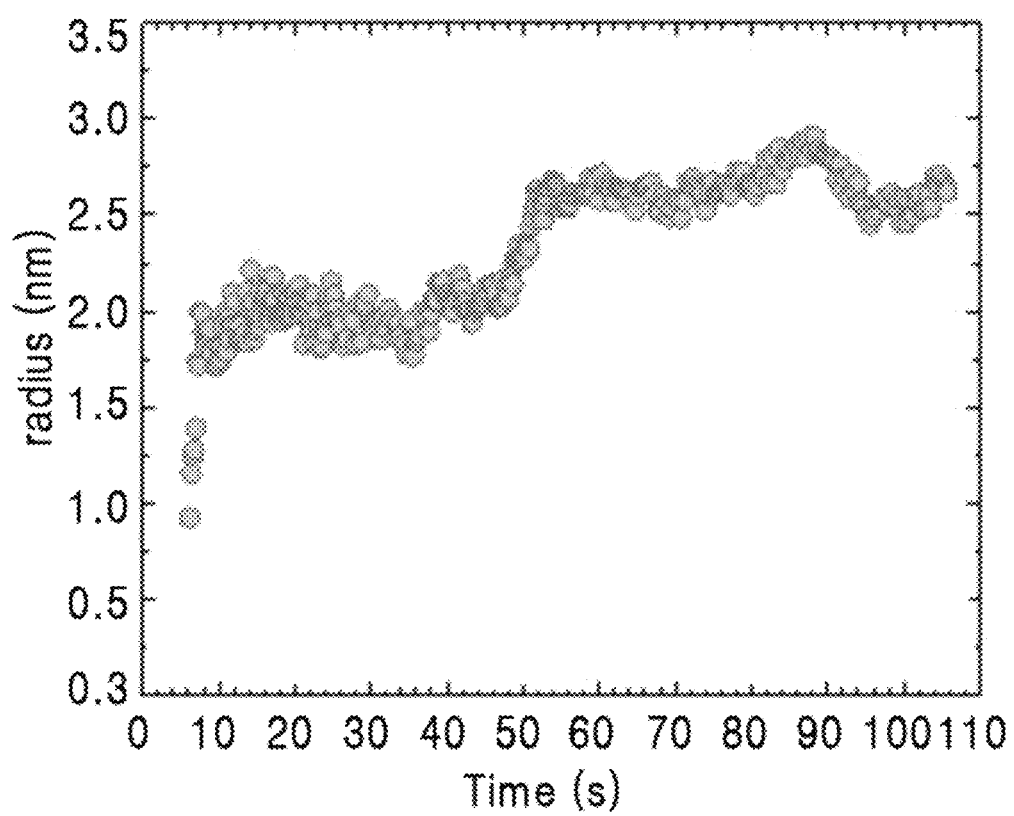
FIG. 6B shows TEM analysis results of a growth process of palladium hydride nanoparticles prepared according to an embodiment of the present invention over time.
Figure 6C:
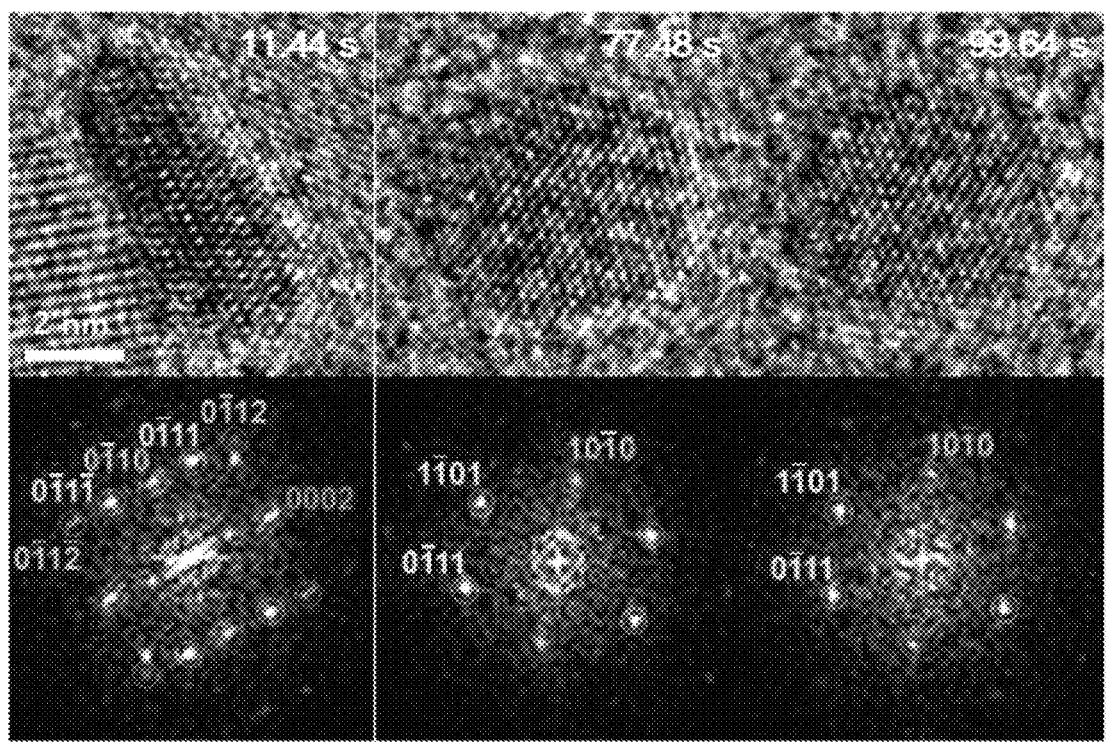
FIG. 6C shows TEM electron diffraction pattern analysis results of palladium hydride nanoparticles prepared according to an embodiment of the present invention over time.

FIG. 6 shows results of observing a nucleation process and a growth process of palladium hydride nanoparticles over time in Sample 1. FIG. 6A shows interplanar distance changes of the nanoparticles over time, and FIG. 6B shows radius changes of the generated nanoparticles. FIG. 6C shows electron diffraction patterns of nanoparticles over time.

Based on the results of FIGS. 6A and 6B, it may be confirmed that the generated palladium hydride nanoparticles are formed through a nucleation process and a growth process of merging generated nuclei. Also, based on the electron diffraction patterns shown in FIG. 6C, it may be confirmed that the generated palladium nanoparticles have the hcp crystal structure from the early stage of the nucleation process and retain the initial hcp crystal structure even during the growth process through merging.

Figure 7:
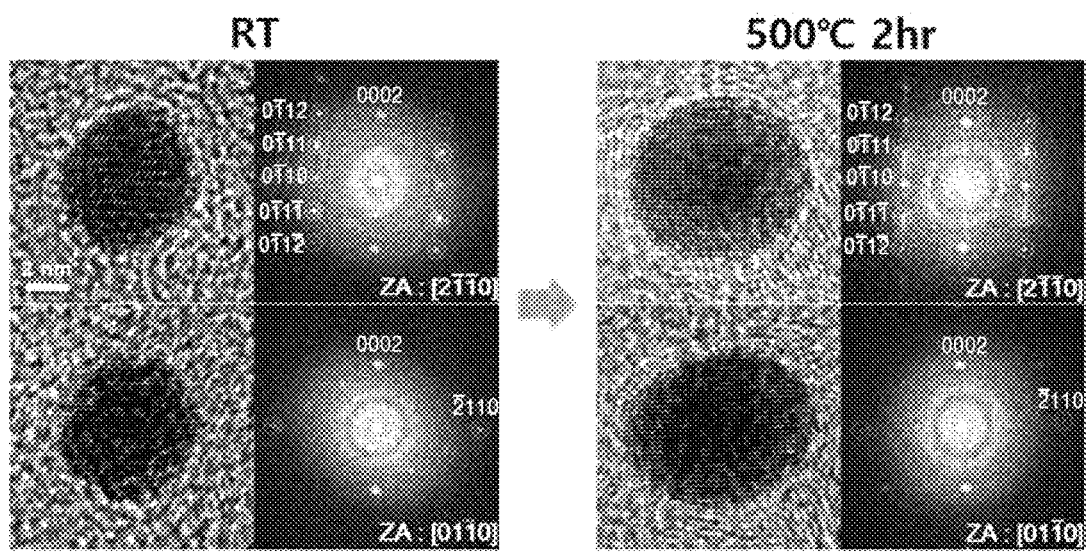
FIG. 7 shows TEM analysis results of crystal structures of palladium hydride nanoparticles prepared according to an embodiment of the present invention after heat treatment at 500° C. for 2 hours to test thermal stability thereof.

FIG. 7 shows results of observing crystal structures of palladium hydride nanoparticles after heat treatment at 500° C. for 2 hours by using a TEM to test thermal stability of the nanoparticles corresponding to Sample 1. (A) of FIG. 7 shows results before the heat treatment, and (b) of FIG. 7 shows results after the heat treatment.

Referring to FIG. 7, it may be confirmed that the hcp crystal structure of the nanoparticles are maintained even after heat treatment and no interplanar distance changes were observed. Based thereon, it may be confirmed that the palladium hydride nanoparticles having the hcp crystal structure and prepared according to an embodiment of the present invention had higher thermal stability than conventional palladium hydride particles having the fcc crystal structure. Therefore, an excellent hydrogen-storing medium may be prepared by using the hcp palladium hydride when compared with conventional palladium hydrides.

According to an embodiment of the present invention as described above, a palladium hydride having a hcp crystal structure may be obtained by high-energy electron beam irradiation. However, the scope of the present invention is not limited by these effects.

While one or more embodiments of the present invention have been described with reference to the drawings, it will be understood by those of ordinary skill in the art that various changes in form and details may be made therein without departing from the spirit and scope of the present invention as defined by the following claims.

What is claimed is:

1. A method of preparing palladium hydride nanoparticles having a hexagonal close packing (hcp) crystal structure, the method comprising:
   (a) preparing a liquid cell containing a palladium precursor solution;
   (b) applying electron beams to the palladium precursor solution contained in the liquid cell; and
   (c) generating the palladium hydride nanoparticles having the hcp crystal structure in the palladium precursor solution.

2. The method of claim 1, wherein the liquid cell operates in a transmission electron microscope.

3. The method of claim 2, wherein when the liquid cell is a graphene liquid cell (GLC) or a silicon nitride ($Si_3N$) liquid cell, an electron beam dose rate in the step (b) is in the range of $5.0 \times 10^{-1}$ to $1.0 \times 10^4$ $e^-/(Å^2 \cdot s)$.

4. The method of claim 1, wherein an acceleration voltage of the electron beams is in a range of 10 kV to 1000 kV.

5. The method of claim 1, wherein a palladium precursor included in the palladium precursor solution has a hcp crystal structure.

6. The method of claim 1, wherein a palladium precursor included in the palladium precursor solution is one selected from the group consisting of a palladium nitride, a palladium chloride, a palladium sulfide, a palladium acetate, a palladium acetylacetonate, a palladium cyanate, a palladium isopropyl oxide, a palladium butoxide, and any combination thereof.

7. The method of claim 1, wherein the palladium hydride nanoparticles are nanoparticles of a compound represented by Formula 1 below:

$$PdH_x \ (0 < x \leq 2). \hspace{2cm} \text{Formula 1}$$

* * * * *